US009036698B2

(12) United States Patent
Laksono et al.

(10) Patent No.: US 9,036,698 B2
(45) Date of Patent: May 19, 2015

(54) METHOD AND SYSTEM FOR RATE CONTROL DURING VIDEO TRANSCODING

(75) Inventors: Indra Laksono, Richmond Hill (CA); Zhihua Zeng, North York (CA)

(73) Assignee: VIXS Systems Inc., Toronto (CA)

( * ) Notice: Subject to any disclaimer, the term of this patent is extended or adjusted under 35 U.S.C. 154(b) by 2735 days.

(21) Appl. No.: 11/488,482

(22) Filed: Jul. 18, 2006

(65) Prior Publication Data

US 2006/0256861 A1    Nov. 16, 2006

Related U.S. Application Data

(63) Continuation of application No. 09/990,737, filed on Nov. 21, 2001, now Pat. No. 7,356,079.

(51) Int. Cl.
| | |
|---|---|
| *H04N 7/12* | (2006.01) |
| *H04N 11/02* | (2006.01) |
| *H04N 11/04* | (2006.01) |
| *H04N 19/40* | (2014.01) |
| *H04N 19/176* | (2014.01) |
| *H04N 19/172* | (2014.01) |
| *H04N 19/61* | (2014.01) |
| *H04N 19/126* | (2014.01) |
| *H04N 19/152* | (2014.01) |
| *H04N 19/18* | (2014.01) |

(52) U.S. Cl.
CPC .............. *H04N 19/40* (2014.11); *H04N 19/176* (2014.11); *H04N 19/172* (2014.11); *H04N 19/61* (2014.11); *H04N 19/126* (2014.11); *H04N 19/152* (2014.11); *H04N 19/18* (2014.11)

(58) Field of Classification Search
CPC . H04N 19/126; H04N 19/152; H04N 19/172; H04N 19/176
USPC ........................................ 375/240.01, 240, 25
See application file for complete search history.

(56) References Cited

U.S. PATENT DOCUMENTS

| | | | |
|---|---|---|---|
| 4,536,856 A | * | 8/1985 | Hiroishi ........................... 345/87 |
| 5,684,917 A | | 11/1997 | Yanagihara et al. |
| 5,880,785 A | | 3/1999 | Fujiwara |
| 5,887,061 A | | 3/1999 | Sato |
| 5,929,916 A | | 7/1999 | Legall et al. |
| 5,963,703 A | | 10/1999 | Higurashi et al. |
| 6,011,587 A | | 1/2000 | Sakazawa et al. |
| 6,160,846 A | | 12/2000 | Chiang et al. |
| 6,172,988 B1 | | 1/2001 | Tiernam et al. |
| 6,278,735 B1 | | 8/2001 | Mohsenian |
| 6,426,772 B1 | | 7/2002 | Yoneyama et al. |

(Continued)

OTHER PUBLICATIONS

International Organisation for Standardisation; "Test Model 5, Draft Revision 2"; ISO/IEC; JTC1/SC29WG11/N0400; Apr. 7, 1993; pp. 1-119.

(Continued)

*Primary Examiner* — Nhon Diep (57) ABSTRACT

A local system encodes previously decoded video data using a transcoding quantization value based on a source quantization value provided by a previous encoder as part of the retrieved video data. The transcoding quantization value can be determined additionally based the fullness of the video buffer of a target system, where a measure of the fullness can be obtained directly from the target system or modeled by the local system. The video data is encoded by the local system and then provided to a target system for decoding and subsequent display and/or storage.

20 Claims, 5 Drawing Sheets

(56) References Cited

U.S. PATENT DOCUMENTS

| | | |
|---|---|---|
| 6,570,922 B1 | 5/2003 | Wang et al. |
| 6,741,648 B2 | 5/2004 | Karczewicz et al. |
| 6,751,259 B2 | 6/2004 | Zhang et al. |
| 6,834,080 B1 | 12/2004 | Furukawa et al. |
| 6,847,656 B1 | 1/2005 | Wu et al. |
| 7,170,938 B1* | 1/2007 | Cote et al. ............ 375/240.03 |
| 7,403,564 B2 | 7/2008 | Laksono |
| 2001/0001615 A1* | 5/2001 | Bailleul .................... 375/242 |
| 2002/0090027 A1 | 7/2002 | Karczewicz |
| 2002/0178215 A1 | 11/2002 | Laksono et al. |
| 2005/0041689 A1* | 2/2005 | Wu et al. .................... 370/477 |

OTHER PUBLICATIONS

Tudor et al., "Real-Time Transcoding of MPEG-2 Video Bit Streams," International Broadcasting Convention (IBC 97), Amsterdam, Sep. 12-16, 1997; pp. 286-301.

Examination Report, European Patent Office (Application No. 02 771 967.3), Apr. 25, 2007, 5 pages.

Examination Report, Indian Patent Office (Application No. 731/KOLNP/2004), Feb. 23, 2007, 7 pages.

* cited by examiner

METHOD AND SYSTEM FOR RATE CONTROL DURING VIDEO TRANSCODING

CROSS-REFERENCE TO RELATED APPLICATION(S)

The present application is a continuation of U.S. patent application Ser. No. 09/990,737 filed on Nov. 21, 2001 and entitled "METHOD AND SYSTEM FOR RATE CONTROL DURING VIDEO TRANSCODING," the entirety of which is incorporated by reference herein.

FIELD OF THE DISCLOSURE

The present disclosure relates generally to rate control for the transcoding of pre-encoded digital video and more particularly to efficiently calculating quantization parameters based on the information extracted from the pre-encoded video to achieve a target bit rate.

BACKGROUND

One common concern when transmitting pre-encoded video data is how to adapt pre-encoded video into communication channels that have different bandwidths. Most of the pre-encoded video streams are encoded with very high bit rates to ensure high-quality video. Transmitting such high bit rate video streams is usually expensive and sometimes infeasible since the communication channel cannot provide enough bandwidth. A common approach to reduce a pre-encoded video bit rate is to decode the video to generate raw pixel data first, and then re-encode the raw pixel data at a different bit rate. However, this method of simple re-encoding is expensive in terms of complexity and cost, and may introduce a delay resulting from the frame reordering. It needs one decoder and one fully functional encoder to re-encode video data. Furthermore, since the encoder needs to perform a motion search again and make new encoding decisions (e.g. picture coding types, macroblock modes and quantization parameters) based on the decoded data, the video quality generally will degrade significantly, in an effect known as generation loss or cascade coding loss.

Another approach to reduce pre-encoded video bit rates is to use a transcoding system that reuses some of the original coding decisions. However, if such a transcoding system uses one or more traditional rate control algorithms, such as the motion pictures experts group-2 test model 5 (MPEG2 TM5) rate control algorithm, the quality of the transoded video generally will still suffer from degradation due to a number of factors. One factor is a potential difference between the rate control parameters used by the source system and those used by the transcoding system. Another factor is the presence of impairments, such as quantization loss, in the original pre-encoded streams that are not considered by the transcoding system. Additionally, the algorithms used by these types of transcoding systems are computational expensive and inefficient because they often need prior knowledge of the coding type of a group of pictures, and this information may not be available beforehand. Furthermore, a large buffer is often utilized to extract this information, and a large processing delay can be introduced. These common transcoding systems also may need to calculate an activity indication of every macroblock in a picture, and often need feedbacks from the entropy encoding module for every macroblock.

Given these limitations, as discussed, it is apparent that an improved rate control method for transcoding of pre-encoded video data would be advantageous.

BRIEF DESCRIPTION OF THE DRAWINGS

Various advantages, features and characteristics of the present disclosure, as well as methods, operation and functions of related elements of structure, and the combination of parts and economies of manufacture, will become apparent upon consideration of the following description and claims with reference to the accompanying drawings, all of which form a part of this specification.

DETAILED DESCRIPTION OF THE FIGURES

In accordance with at least one embodiment of the present disclosure, a quantization value for a source macroblock is received and a quantization value for a destination macroblock is determined based on the source quantization value and an expected amount of data in a video buffer. One advantage of the present disclosure is that buffer size is minimized since buffering of more than one video picture to determine the bit allocation is not needed. Another advantage is that buffer overflow and/or underflow can be avoided. Yet another advantage is that less effort is required to pipeline of macroblocks since quantization parameters for an entire picture can be determined in advance. An additional advantage is that video quality is improved due to a more accurate estimation of the output bit rate.

FIGS. 1-5 illustrate a system and a method for efficient rate control of pre-encoded video content. In at least one embodiment, a local encoder of a local system encodes previously decoded video data using a transcoding quantization value based on a source quantization value provided by a previous encoder as part of the retrieved video data. The video data is encoded by the local system and then provided to a target system for decoding and subsequent display and/or storage. In at least one embodiment, the transcoding quantization value is determined by taking a ratio of the source quantization value to a quantization ratio, where the quantization ratio is based on one or more factors, such as transcoding options (the scaling factors that control the output video resolution and/or the frame dropping flag, for example), bit budget and bit consumption status, and/or characteristics of the video buffer of the target system. The characteristics of the video buffer can include a fullness of the video buffer and/or a buffer delay that indicates how long until a buffered frame be decoded and removed by the target system. In one embodiment, the characteristics of the video buffer are obtained directly from the target system, and therefore represent the actual characteristics. In another embodiment, the characteristics of the video buffer are modeled by the local system, such as by modeling a Video Buffering Verifier (VBV) buffer, and therefore represent expected characteristics. The characteristics of a VBV buffer can be modeled at the local encoder by comparing the amount of video data sent by the local system for input to the video buffer of the target system with the amount of data being output from the video buffer at a known frame rate.

Figure 1:
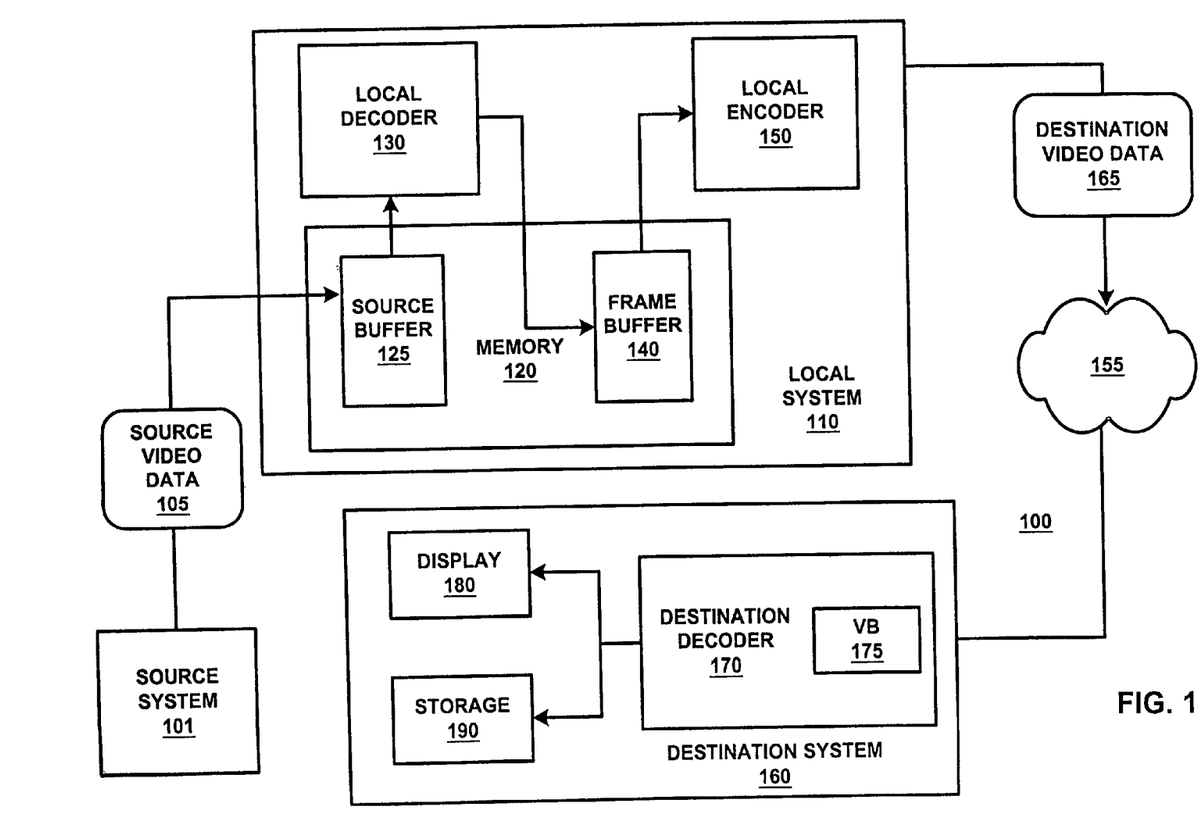
FIG. 1 is a block diagram illustrating a system for providing video content according to at least one embodiment of the present disclosure.

Referring now to FIG. 1, video system 100 is illustrated according to at least one embodiment of the present disclosure. Video system 100 includes source system 101, local system 110, communication medium 155, and target system 160. Local system 110 includes memory 120, source buffer 125, local decoder 130, frame buffer 140 and local encoder 150. In at least one embodiment, local system 110 includes a transcoding system for transcoding video data from source system 101. Accordingly, local system 110 is referred to herein as transcoding system 110 which, in one embodiment, can include features similar to those described in pending patent application having attorney docket number VIXS.0100120 filed concurrently and entitled "SYSTEM AND METHOD FOR MULTIPLE CHANNEL VIDEO TRANSCODING", which is herein incorporated by reference. Reference to transcoding system 110 also applies to other embodiments of local system 110 unless otherwise noted. Likewise, local encoder 150 and local decoder 130 are herein referred to as transcoding encoder 150 and transcoding decoder 130 respectively. Target system 160 includes target decoder 170, display 180 and/or storage 190. In at least one embodiment, transcoding system 110 represents a video transcoder. In this case, transcoding system 110 decodes source video data 105 received from source system 101 and transcodes the decoded source video data 105 into target video data 165, where target video data 165 can have different properties than source video data 105, such as a different frame rate, a different bit rate, a different resolution, and the like. Target video data 165 is provided to target system 160 where it can be decoded and displayed and/or stored for later retrieval.

Generally, source video data 105 can include video data compressed and/or encoded using one of a variety video encoding/compression formats. For example, in one embodiment, source video data 105 includes video data encoded using a Motion Pictures Experts Group (such as MPEG-2) format. Received source video 105 is stored in transcoding system 110, such as in source buffer 125, and then retrieved by transcoding decoder 130 for decoding. The output of transcoding decoder 130 can be stored in frame buffer 140. Source coding information associated with the decoding of source video data 105, such as quantization values and motion vectors associated with macroblocks of source video data 105, can be sent to transcoding encoder 150 as needed. Source buffer 125 and frame buffer 140, in one embodiment, are implemented in memory 120 as illustrated in FIG. 1. Memory 120 can include one or more of random access memory (RAM), cache, disk storage, and the like, and may include a frame buffer.

Transcoding encoder 150, in one embodiment, re-encodes the decoded output of transcoding decoder 130 stored in frame buffer 140 into target video data 165 that can have different characteristics than source video data 105, such as a different resolution, frame rate, bit rate, and the like. For instance, transcoding encoder 150 can alter the frame rate by dropping frames. For example, source video data 105 can be encoded to have a frame rate of 60 frames/second (fps) while a user indicates a desired a frame rate of 30 fps for target video data 165. In this case, transcoding encoder 150 can encode every other source frame stored in frame buffer 140 for inclusion as target video data 165. Transcoding encoder 150 then provides target video data 165 to target system 160 via communication medium 155. Communication medium 155 can include a wireless medium, a physical medium, or a combination thereof.

Target video data 165, in at least one embodiment, is stored in target video buffer 175 before it is decoded at target system 160. Target decoder 170 can retrieve target video data 165 from target video buffer 175 and decode it for display on display device 180, where display device 180 can include one of a variety of display devices, such as a television, computer monitor, and the like. Alternatively, target video data 165 can be stored in its encoded and/or decoded form in storage 190. Storage 190 can include a variety of storage devices, such as a hard disk, a digital versatile disc (DVD) writer, a memory stick, and the like Ideally, the bit rate of source video data 105 is less than the data transmission rate of communication medium 155, and the transcoding system 110 can be bypassed. However, it will be appreciated this ideal scenario is unlikely to occur in many circumstances. For example, a typical HDTV stream is encoded at 18.2 M bit/second (bps), while a digital subscriber line (DSL) generally can provide only a 1 Mbps to 3 Mbps channel bit rate. For wireless communications, the difference between the desired bit rate and the available bit rate is even more pronounced and the channel bandwidth may vary from time to time. In such cases, transcoding system 110 can be utilized to adapt the bit rate of target video data 165 to the channel bit rate of communication medium 155. While changing the source video bit rate to the target video bit rate, the rate control module of transcoding system 110 often needs to control the data size of each transcoded frame to avoid overflow or underflow of video buffer 175 of target system 160.

Ideally, the input data rate to video buffer 175 would equal the output data rate from video buffer 175, resulting in zero net change in the fullness of video buffer 175. However, it will be appreciated this ideal scenario is unlikely to occur in many video systems. For one, it is unlikely that the frames being transmitted are the same size. For example, according to the MPEG standard, encoded frames can include I-frames, B-frames, and P-frames, each generally having a significantly different data size. For example, because I-frames are intra-encoded and can therefore be decoded from only the data included in the I-frame, they are generally represented by more data than P-frames and B-frames, which can use prediction data from previous and/or future frames during decoding. Likewise, frames of the same type can often have different amounts of data due to the content of the frame and the quantization parameters. For a constant data rate communication channel, the transmission time of a frame is proportional to its size; larger frames take longer time to transmit and smaller frames take shorter time to transmit. As a result, the number of frames an encoder can send to the target decoder video buffer per second will vary due the variation of encoded frame data size, while the target decoder will decode and display video at a fix frame rate, resulting in an increase or decrease in the number of frames and/or the amount of data in the video buffer.

Accordingly, the rate control module in a transcoding system controls each encoded video frame size so that the average bit rate equal to the channel data rate and the video buffer 175 of target system 160 won't overflow or underflow. This is achieved by increasing or reducing the amount of data used to represent frames of target video data 165 based on underflow or overflow concerns of video buffer 175. For example, in one embodiment, data is transmitted over communication medium 155 at a relatively constant data transmission rate in order to utilize fully the bandwidth of communication medium 155. In this case, the amount of data representing the encoded frames of target video data 165 can be increased to reduce the number of frames transmitted over a certain time period. Because target decoder 170 decodes video at a fixed frame rate, the larger the frame size, the faster the decoder removing data from video buffer 175. In other words, by controlling the frame data size, the rate control actually controls how fast data is removed from a buffer. If data is removed too fast compare to the channel data rate, buffer underflow occurs, inversely, buffer overflow occurs. The purpose of a rate control module is to make the average output data rate equal to the channel data rate, which is the input data rate of the video buffer 175. The rate control module is discussed in greater detail with reference to FIG. 2.

In at least one embodiment, the amount of data associated with a frame is increased or reduced by modifying the quantization values of a quantization matrix used to quantize the output of a discrete cosign transform (DCT) module of transcoding encoder 150. By increasing the quantization values, more zeros are likely to occur in the quantized output, and by decreasing the quantization value, fewer zeros are likely to occur. The amount of data is generally increased or decreased based on the number of zeros as a result of a compression operation of an encoder, such as a run-length encoder or variable length encoder on the quantized output. In at least one embodiment, the quantization value used to quantize a certain macroblock is determined by transcoding encoder 150 based on the previous quantization value used to quantize the macroblock received from the source and the ratio between the source data rate and the target data rate. Additionally, the quantization value can be adjusted according to one or more transcoding options and the expected fullness of the target video buffer, where the expected fullness is determined using a hypothetical decoding buffer (e.g. a VBV buffer) or from fullness information obtained from the target system. Methods to determine the quantization value used to quantize elements of a destination macroblock or a frame are discussed in greater detail subsequently.

Figure 2:
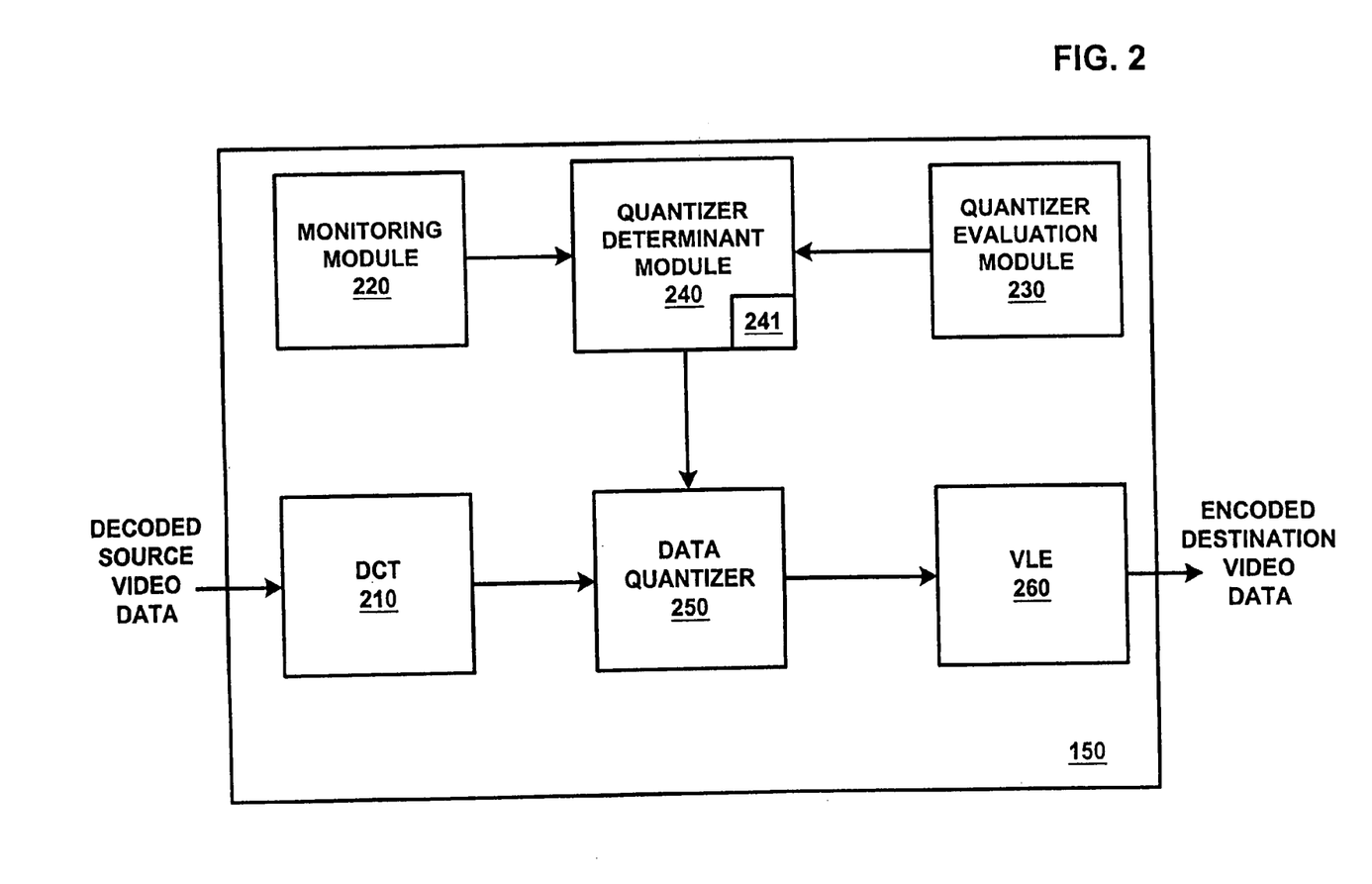
FIG. 2 is a block diagram illustrating an encoder to determine a transcoding quantization value based on a source quantization value according to at least one embodiment of the present disclosure.

Referring now to FIG. 2, transcoding encoder 150 is illustrated in greater detail according to at least one embodiment of the present disclosure. Transcoding encoder 150 includes motion compensation module 200, discrete cosine transform (DCT) module 210, monitoring module 220, estimation module 230, rate control module 240, quantizer 250, and variable length encoder 260. Elements of transcoding encoder 150 can be implemented as software, hardware, firmware, or a combination thereof.

Recall that, in one embodiment, transcoding encoder 150 modifies the amount of data associated with a frame by modifying the source quantization value, used by the transcoding system to dequantize the source video data, to generate a transcoding quantization value. DCT module 210 performs a discrete cosine transform on a macroblock of the decoded and motion compensated source video data (only residual data for inter macroblocks) provided by motion compensation module 200. Quantizer 250 then performs a quantization operation on the output of DCT module 210 using the transcoding quantization value. The output of quantizer 250 is provided to variable length encoder (VLE) 260, where a run-length and/or variable-length encoding is performed on the output of quantizer 250. The output of VLE 260 can then be buffered, multiplexed and/or transmitted to a target decoding system, such as target system 160 of FIG. 1. By modifying the quantization value, the amount of data associated with a certain macroblock and/or frame can be increased or decreased as needed, as discussed previously.

In at least one embodiment, the transcoding quantization value used by quantizer 250 is provided by rate control module 240. One method employed by rate control module 240 to determine the transcoding quantization value based on a ratio between the source quantization value and a quantization ratio. This is shown by the following equation:

$$trcQ = \frac{srcQ}{qRatio}$$

where trcQ is the transcoding quantization value, srcQ is the source quantization value, and qRatio is the quantization ratio. The initial value for the quantization ratio (qRatioInit), in one embodiment, is set to the transcoding ratio (trcRatio), which is the ratio between the target bit rate (tgtBitRate) and the source bit rate (srcBitRate), shown by the following equation:

$$qRatioInit = trcRatio = \frac{tgtBitRate}{srcBitRate}$$

In at least one embodiment, quantization ratio generator 241 determines the quantization ratio based on the initial quantization ratio, transcoding options and the status of the target video buffer. Quantization ratio generator 241 generally attempts to achieve the target bit rate while maintaining correct target buffer fullness and to avoid allocating more bits than necessary to the impaired video data. The operation of quantization ratio generator 241 is discussed in greater detail with reference to FIG. 5.

Monitoring module 220, in one embodiment, emulates and the video buffer of the target system using a local model of the target video buffer, such as a VBV buffer model, to determine an expected characteristic of the target video buffer. The value representing the characteristic, such as VBV delay to represent fullness, is provided to rate control module 240. Monitoring module 220 can set the start fullness of the VBV buffer model to a certain percentage of the VBV buffer size (i.e. 75%+/−0.10), and set the initial VBV delay of the first transcoded frame to reflect the start fullness of the VBV buffer. After transcoding a frame, monitoring module 220 updates the VBV buffer status by decreasing the same data amount represented by the transcoded frame from the VBV buffer fullness value, and calculates the VBV delay for the next picture according to the new buffer fullness value. Alternatively, in one embodiment, modeling module 220 sets the fullness and/or the buffer delay to its maximum value to indicate that the video being transcoded is a variable bit rate (VBR) stream. In this case, the data size of every frame is modified proportionally and the bit rate profile is the same as the input stream.

Rather than model or emulate the expected fullness of the target video buffer, in one embodiment, monitoring module 220 directly determines the fullness or the buffer delay of the video buffer. For example, monitoring module 220 can periodically poll a control module that controls the behavior of the video buffer to obtain the fullness of the video buffer. For instance, the control module can return the address value of the most recently stored data in the video buffer. This address value can then be used to determine the fullness of the video buffer. For example, the address values of the video buffer can include a linearly increasing sequence of addresses, such as from 0 to 99, where data is stored starting at address 0. In this case, by returning an address value of 74, then it can be assumed that the video buffer is around 75% full ((74+1)/(99+1)). Other methods of determining the fullness or buffer delay of a video buffer can be used without departing from the spirit or the scope of the present disclosure Transcoding decoder 130 (FIG. 1), in one embodiment, provides the source quantization value to rate control module 240 for generation of the transcoding quantization value. In one embodiment, transcoding decoder 130 extracts the source quantization value from the stored source video data. In another embodiment, rate control module 240 has access to a table of quantization values, where the source quantization values are provided by the source system to decode. The source quantization value can include a single quantization scale value that is applied to each element of a DCT coefficient matrix, or a matrix of quantization values corresponding to the DCT coefficient matrix.

Figure 3:
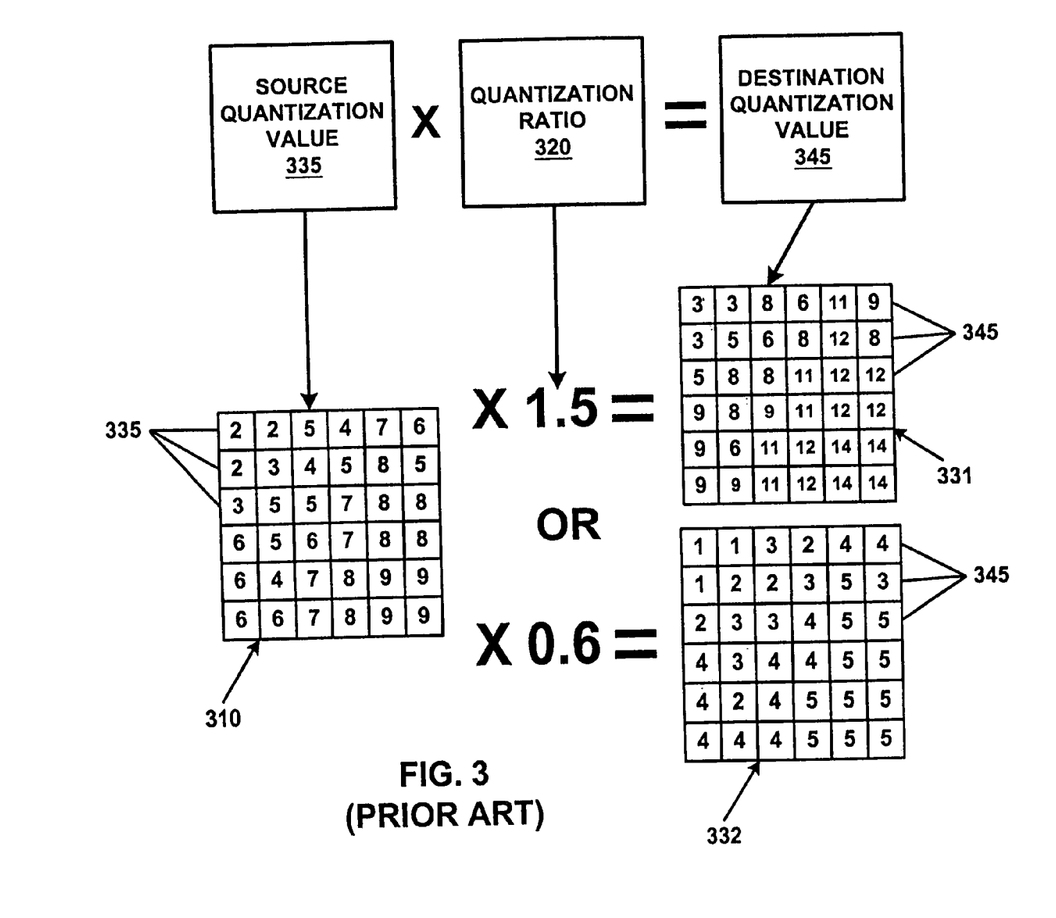
FIG. 3 is a block diagram illustrating an application of a quantization ratio to a quantization matrix to modify the values of the quantization matrix.

Referring to FIG. 3, the effect of various quantization ratios applied to the source quantization value is illustrated according to at least one embodiment of the present disclosure. As discussed previously, transcoding quantization value 345 is determined by multiplying source quantization value 335 with quantization ratio 320, where quantization ratio 320 is generated by quantization ratio generator 241. As discussed previously, the source quantization value 335 may be a combination of a quantization scale value that is applied to each element of a DCT coefficient matrix and a matrix of quantization values corresponding to the DCT coefficient matrix.

As illustrated with transcoding quantization matrix 331, the application of a quantization ratio 320 of 0.6 to source quantization matrix 310 generates transcoding quantization matrix 331 having transcoding quantization values 345 greater than or equal to the corresponding source quantization values of source quantization matrix 310. Alternatively, applying a quantization ratio 320 of 1.5 results in destination matrix 332 having transcoding quantization values 345 less than or equal to the corresponding quantization values of source quantization matrix 310. It will be appreciated that usually higher the quantization matrix value results in a quantized DCT coefficient matrix having more zeros than lower quantization matrix value. The higher the quantization ratio, the smaller the quantization matrix, and hence the higher output bit rate. As a result, lower quantization ratio can be used to decrease the amount of data associated with a DCT coefficient matrix, while higher quantization ratio can be used to increase the amount of data.

Figure 4:
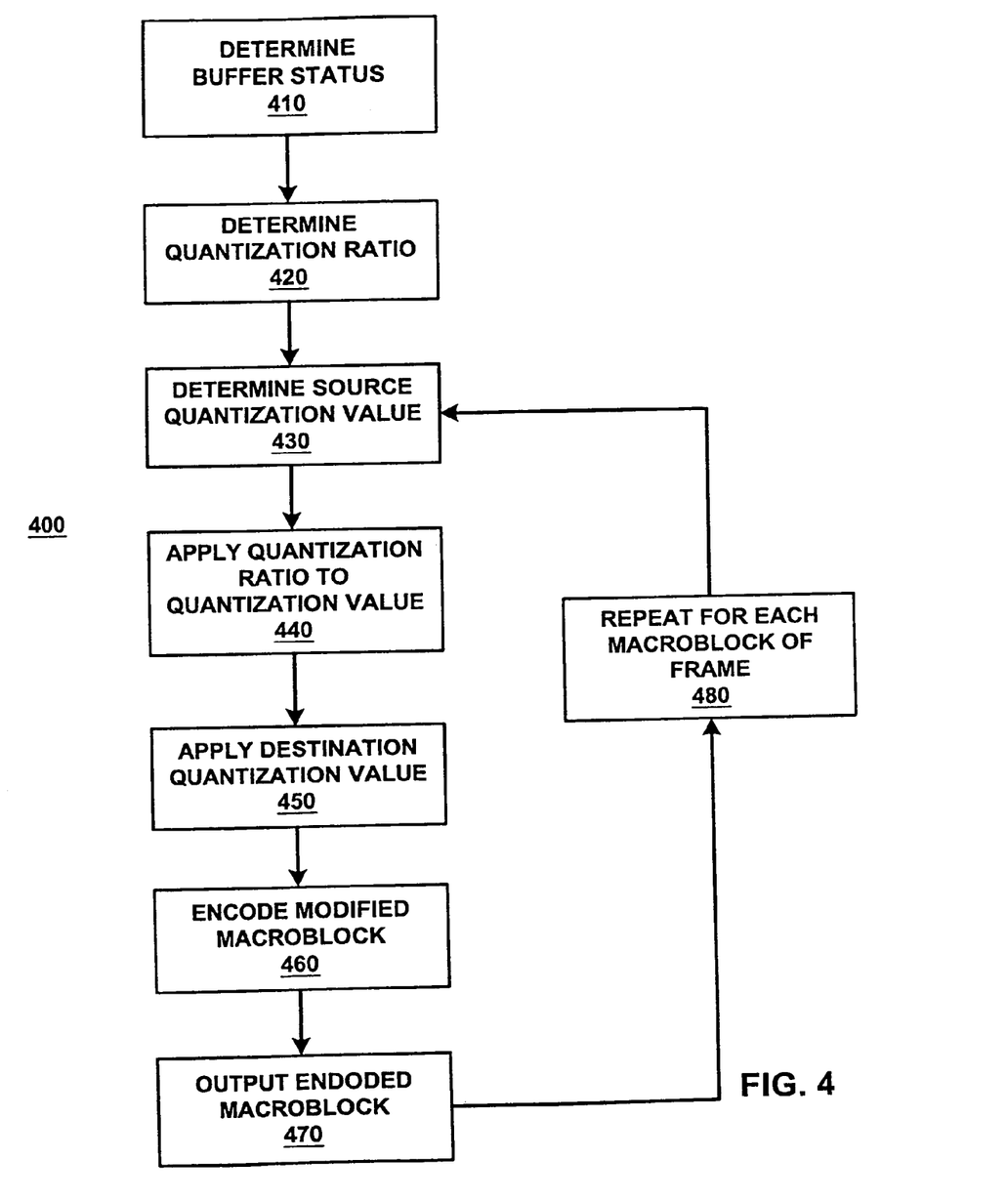
FIG. 4 is a flow diagram illustrating a method for transcoding video content according to at least one embodiment of the present disclosure.

Referring to FIG. 4, a method for efficient control the bit rate for a transcoding system, is illustrated according to at least one embodiment of the present disclosure. Method 400 initiates with step 410 where initial quantization ratio is calculated as discussed previously with reference to FIG. 2.

In step 420, the quantization ratio to be applied to the source quantization value is determined or generated based on the initial quantization ratio calculated in step 410. In at least one embodiment, the quantization ratio is determined based on the bit budget consumption, transcoding options and the status of the target buffer, such as its expected fullness. Step 420 is discussed in greater detail with reference to FIG. 5. In step 430, the source quantization value for a source macroblock of frame being processed is fetched. In step 440, the quantization ratio determined in step 420 is applied to the source quantization value to determine the transcoding quantization value. For example, rate control module 240 of FIG. 2, in one embodiment, takes the ratio between the source quantization value and the quantization ratio to generate the transcoding quantization value. In other embodiments, the transcoding quantization value is determined by other means based on buffer fullness or buffer delay, such as by applying a non-linear function to the source quantization value when certain conditions are met.

In step 450, the transcoding quantization value determined in step 440 is applied to a DCT coefficient matrix representing the selected macroblock of the frame to quantize the DCT coefficient matrix. In step 460, the quantized DCT coefficient matrix is encoded, using run-length, variable-length encoding, and the like. In step 470, the encoded DCT coefficient matrix is output to subsequent systems. In step 480, steps 410-470 are repeated for some or all of the macroblocks of the frame being encoded.

Figure 5:
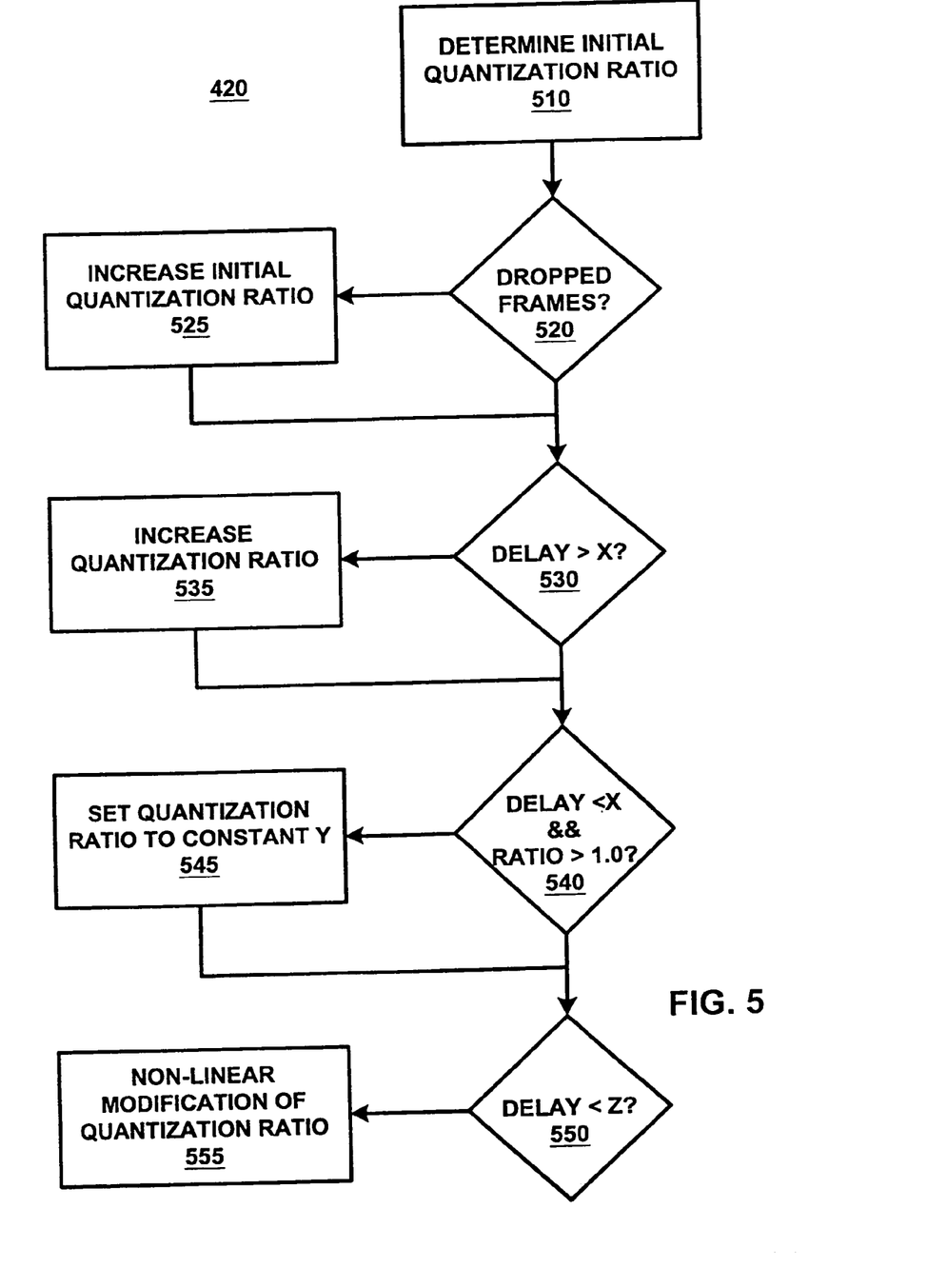
FIG. 5 is a flow diagram illustrating a method for determining a quantization ratio according to at least one embodiment of the present disclosure.

Referring next to FIG. 5, step 420 of method 400 (FIG. 4) is illustrated according to at least one embodiment of the present disclosure. Step 420 initiates with sub-step 510 where the bit consumption is compared to the bit budget. If the bit budget is not equivalent to the bit consumption, an attempt to match the average bit rate with the target bit rate (i.e. the channel bit rate) is made. In at least one embodiment, in order to compensate the error between the bit budget and the actual bit consumption, the initial value is adjusted according to the equation:

$$qRatio = qRatioInit \times \left(1.0 - \frac{\sum_{i=1}^{n}(bitUsed_i - bitBudget_i)}{\sum_{i=n-w}^{n} bitBudget_i}\right)$$

If n<w, then w=n
where qRatio is the quantization ratio, qRatioInit is the initial quantization value determined in step 410 (FIG. 4), bitUsed is the (i)th actual output frame size in bits, and w is the size of a moving window and n is the number of frames that have been encoded. The typical value of w is 4 to 12. The bit budget, bitBudget, is calculated by equation:

$$bitBudget_i = inBitCnt_i \times trcRatio \quad (EQ.5\text{-}515.2)$$

where inBitCnt is the (i)th input frame data size in bits, trcRatio is the transcoding ratio determined as discussed with reference to FIG. 2.

In sub-step 520, transcoding options including drop frame and scale video are evaluated and compensated for in sub-step 525, if necessary. Compensation of scaling is done through the equation:

$$qRatio = qRatio \times (xscale * yscale)^Z \quad (EQ.5\text{-}525.1)$$

Where qRatio is the result of sub-step 510 and/or 525, xscale is the ratio between the input horizontal frame size and the output horizontal frame size, yscale is the ratio between the input vertical frame size and the output vertical frame size, and Z is a constant less than 1. In at least one embodiment, Z is 0.75+/−0.10. For example, assume that the input horizontal frame size is 704 pixels and the input vertical frame scale is 480 pixels, while the output horizontal frame size of the corresponding transcoded frame is 352 pixels and the output vertical frame size is 240. In this case, xscale would be 2 (704/352) and yscale would be 2 (480/240). Also, assume that Z is 0.75. In this case, the compensation factor would be approximately 2.83 (4 to the power of 0.75).

The drop-frame flag, used to indicate a difference in frame display rates between the source video data and the target video data, can also be checked in sub-step 520. For example, if the frame rate of the source video data is 60 fps and a user indicates a desired frame display rate of 30 fps for the target video data, then an average of one of every two frames must be dropped. If frames are dropped, compensation is done through the equation:

$$qRatio = qRatio \times D$$

Where qRatio is the result of the previous step and D is a constant larger than 1 and less than 2. In at least one embodiment, D is 1.2 for dropping every other frame. If no frame is dropped, sub-step 520 continues to sub-step 530.

In sub-step 530, the fullness of the video buffer is compared to first indicator value X and at sub-step 540 the fullness of the video buffer is compared to value X and the value of the quantization ratio is compared to the value of 1.0. Recall that the fullness of the target video buffer can be determined by modeling the video buffer, such as using a VBV buffer model, or characteristics of the video buffer can be obtained directly from the target system. If the buffer fullness is less than first indicator value X and the value of the quantization ratio is greater than 1.0, then value of the quantization ratio is set to a constant value Y in step 535. In at least one embodiment, Y is 1.0. By setting the quantization ratio to 1.0, the transcoding quantization value will be the same as the source quantization value assuming no further modification of the value of the quantization ratio. In one embodiment, the quantization ratio is set to 1.0 because when the buffer fullness falls below first indicator value X, such as the buffer fullness falling below 75% of the maximum buffer capacity, the video buffer is assumed to be within desirable operating parameters, or at least not about to overflow.

If the buffer fullness is larger than first indicator value X, then there is no further modification to the quantization ratio, this means the quantization level can be set as high as necessary (e.g. larger than 1.0) at sub-steps 515 and/or 525 to avoid overflow of the target video buffer. Using quantization ratio larger than 1.0 means using quantization matrix values smaller than the source quantization matrix value, this will generally increase the transcoded frame size without quality gain (i.e. bits are wasted). So only when the target video buffer is risking overflow, in on embodiment, will quantization ratio allowed to be higher than 1.0. For example, if the buffer fullness is greater than 75% of its capacity, which means the video buffer may overflow unless the output data rate of the video buffer is increase, which can be accomplished by increase the data size of the following frames. The data size of the following frames, in one embodiment, can be increased by increasing the quantization ratio to generate a lower-valued quantization matrix, and consequently increase the frame data size. In sub-step 540, the fullness of the video buffer, is compared to a second indicator value Z. In one embodiment, second indicator value Z includes the value of 20%+/−1% of the maximum buffer capacity of the video buffer. If the value representing the fullness of the video buffer falls below second indicator value Z, in one embodiment, the video buffer is considered to have a potential underflow, and the value of the quantization ratio is modified in sub-step 545. In one embodiment, a non-linear function is applied to the quantization ratio in sub-step 545, the non-linear equation as follows:

$$qRatio = qRatio \times X^{\frac{Y-W}{Z}}.$$

Where X is a first constant value, Y is a second constant, W is a value representing the fullness of the video buffer, and Z is a third constant value. In one embodiment, X is 0.9, Y is 13000, and Z is 3000. In this case, if the previous value for the quantization ratio is 0.8 and the measured amount of data in the video buffer (i.e. the fullness of the video buffer) is 9000, then the modified value for the quantization ratio would be 0.695. If the buffer fullness is above second indicator value Z, then it is assumed that the video buffer is within desirable operating parameters. As a result of the modification of the transcoding quantization value based on the fullness of a video buffer and the source quantization value used to quantize the source video data, the size of the transcoded frames transmitted and stored in the video buffer can be efficiently modified to prevent overflow and/or underflow of the video buffer. Note that the values of X, Y, Z have been empirically derived. However, various other values of X, Y, Z can be plugged into the equation to obtain different quantization ratios, and further approximation of the above equation can be done via numerical methods such as Taylor series or quadratic approximations to obtain comparable results, but any reasonable close approximation of the base equation above or simplified values of X, Y, Z to simplify computation are clearly varying implementations of the base quantization equation.

The various functions and components in the present application may be implemented using an information-handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

In the preceding detailed description of the figures, reference has been made to the accompanying drawings that form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. A method comprising:
receiving, at a first device, a first video data comprising a first quantization value associated with a first macroblock;
decoding the first video data to generate the first macroblock;
determining a second quantization value based on the first quantization value, a frame rate of the first video data, a target frame rate of second video data, and a fullness of a video buffer of a second device;
modifying the first macroblock based on the second quantization value to generate a second macroblock;
encoding the second macroblock to generate the second video data; and
providing the second video to the second device.

2. The method of claim 1, further comprising:
determining the fullness of the video buffer.

3. The method of claim 1, wherein the fullness of the video buffer comprises an actual fullness of the video buffer and wherein determining the fullness of the video buffer comprises receiving an indicator of the actual fullness of the video buffer from the second device.

4. The method of claim 3, wherein the indicator comprises an address of the video buffer.

5. The method of claim 1, wherein the fullness of the video buffer comprises an expected fullness of the video buffer and wherein determining the fullness of the video buffer comprises modeling, at the first device, the expected fullness of the video buffer.

6. The method of claim 5, wherein modeling the expected fullness of the video buffer comprises determining a difference between an input bit rate and an output bit rate of the video buffer.

7. The method of claim 5, wherein modeling the expected fullness of the video buffer comprises modeling the expected fullness of the video buffer using a VBV buffer model.

8. The method of claim 1, wherein providing the second video data to the second device comprises providing the second video data for storage at the video buffer of the second device.

9. The method of claim 1, wherein providing the second video data to the second device comprises wirelessly transmitting the second video data to the second device.

10. The method of claim 1, wherein determining the second quantization value comprises:
increasing the first quantization value in response to the buffer fullness being greater than a first threshold; and
decreasing the first quantization value in response to the buffer fullness being less than a second threshold.

11. The method of claim 10, wherein increasing the first quantization value comprises increasing the first quantization value by a first ratio and wherein decreasing the first quantization value comprises decreasing the quantization value by a second ratio.

12. A transcoder comprising:
an input to receive a first video data comprising a first quantization value associated with a first macroblock;
a decoder to generate the first macroblock based on the first video data;
a monitoring module to determine a fullness of a video buffer of a destination device;
a rate control module to determine a second quantization value based on the first quantization value, a frame rate of the first video data, a target frame rate of second video data, and the fullness of the video buffer;
a quantizer to generate a second macroblock based on the first macroblock and the second quantization value;
a variable length encoder to generate the second video data based on the second macroblock; and
an output to provide the second video data to the destination device.

13. The transcoder of claim 12, wherein the fullness of the video buffer comprises an actual fullness of the video buffer and the monitoring module is to determine the fullness of the video buffer based on a fullness indicator from the destination device.

14. The transcoder of claim 13, wherein the fullness indicator comprises an address of the video buffer.

15. The transcoder of claim 12, wherein the fullness of the video buffer comprises an expected fullness of the video buffer and the monitoring module is to determine the fullness of the video buffer based on a modeling of the video buffer.

16. The transcoder of claim 15, wherein the monitoring module is to model the expected fullness of the video buffer based on a difference between an input bit rate and an output bit rate of the video buffer.

17. The transcoder of claim 15, wherein the monitoring module is to model the expected fullness of the video buffer using a VBV buffer model.

18. The transcoder of claim 12, wherein the rate control module is to determine the second quantization value by:
increasing the first quantization value in response to the buffer fullness being greater than a first threshold; and
decreasing the first quantization value in response to the buffer fullness being less than a second threshold.

19. The transcoder of claim 18, wherein increasing the first quantization value comprises increasing the first quantization value by a first ratio and wherein decreasing the first quantization value comprises decreasing the quantization value by a second ratio.

20. The transcoder of claim 12, wherein the output comprises a wireless transmitter.

* * * * *

UNITED STATES PATENT AND TRADEMARK OFFICE
CERTIFICATE OF CORRECTION

| | | |
|---|---|---|
| PATENT NO. | : 9,036,698 B2 | Page 1 of 1 |
| APPLICATION NO. | : 11/488482 | |
| DATED | : May 19, 2015 | |
| INVENTOR(S) | : Indra Laksono et al. | |

It is certified that error appears in the above-identified patent and that said Letters Patent is hereby corrected as shown below:

In the claims,

Column 11, Line 20, please change "providing the second video to the second device" to --providing the second video data to the second device--

Signed and Sealed this
Twenty-third Day of February, 2016

Michelle K. Lee
*Director of the United States Patent and Trademark Office*